(12) United States Patent
Miyake et al.

(10) Patent No.: US 9,643,270 B2
(45) Date of Patent: May 9, 2017

(54) WIRE DISCHARGE-MACHINING APPARATUS WITH PARALLEL CUTTING WIRES

(71) Applicant: MITSUBISHI ELECTRIC CORPORATION, Chiyoda-ku (JP)

(72) Inventors: Hidetaka Miyake, Tokyo (JP); Tatsushi Sato, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 201 days.

(21) Appl. No.: 14/702,409

(22) Filed: May 1, 2015

(65) Prior Publication Data

US 2015/0231719 A1    Aug. 20, 2015

Related U.S. Application Data

(63) Continuation of application No. 12/999,106, filed as application No. PCT/JP2009/060946 on Jun. 16, 2009, now Pat. No. 9,050,672.

(30) Foreign Application Priority Data

Jun. 16, 2008 (JP) ................................. 2008-157236

(51) Int. Cl.
*B23H 7/02* (2006.01)
*H01L 21/78* (2006.01)
(Continued)

(52) U.S. Cl.
CPC ............... *B23H 7/02* (2013.01); *B23H 1/028* (2013.01); *B23H 7/08* (2013.01); *B23H 7/10* (2013.01);
(Continued)

(58) Field of Classification Search
None
See application file for complete search history.

(56) References Cited

U.S. PATENT DOCUMENTS 3,982,179 A   9/1976   Forster
4,193,852 A   3/1980   Inoue
(Continued)

FOREIGN PATENT DOCUMENTS

CH   GB 1512654 A   *  6/1978   ............... B23H 7/04
JP   54 20485          2/1979
(Continued)

OTHER PUBLICATIONS

International Search Report issued Oct. 6, 2009 in PCT/JP09/60946 filed Jun. 16, 2009.
(Continued)

*Primary Examiner* — David Angwin
*Assistant Examiner* — John J Norton
(74) *Attorney, Agent, or Firm* — Oblon, McClelland, Maier & Neustadt, L.L.P.

(57) ABSTRACT

A wire machining method includes: a wire electrode set as cutting wires provided in parallel with a distance between the cutting wires of which a predetermined regional part faces a workpiece; a machining power source that generates a pulse-shaped machining voltage; and plural feeder units that are electrically connected to the plural cutting wires respectively of the wire electrode and supply the machining voltage between the cutting wires and the workpiece respectively. In the parallel cutting wires, the feeder units are arranged such that a direction of a current passed to at least a part of the cutting wires becomes a direction different from a direction of a current passed to other cutting wires.

4 Claims, 5 Drawing Sheets

(51) Int. Cl.
*B23H 7/10* (2006.01)
*B23H 1/02* (2006.01)
*B23H 7/08* (2006.01)
*B28D 5/04* (2006.01)
*B23H 9/00* (2006.01)
*B23H 11/00* (2006.01)

(52) U.S. Cl.
CPC ............ *B23H 9/00* (2013.01); *B23H 11/006* (2013.01); *B28D 5/045* (2013.01)

(56) References Cited

U.S. PATENT DOCUMENTS

| | | | |
|---|---|---|---|
| 4,652,717 A | | 3/1987 | Briffod et al. |
| 4,659,893 A | | 4/1987 | Martin |
| 4,661,674 A | | 4/1987 | Inoue |
| 4,878,866 A | * | 11/1989 | Mori ........................ H01J 1/148 219/69.12 |
| 5,019,685 A | | 5/1991 | Nishimura |
| 7,982,157 B2 | * | 7/2011 | Schoepf .................. B23H 7/10 219/69.12 |
| 2009/0014420 A1 | | 1/2009 | Sato |
| 2009/0314747 A1 | | 12/2009 | Hashimoto et al. |
| 2012/0217224 A1 | | 8/2012 | Miyake et al. |
| 2013/0043217 A1 | | 2/2013 | Yuzawa et al. |
| 2015/0001182 A1 | | 1/2015 | Kurihara |

FOREIGN PATENT DOCUMENTS

| | | |
|---|---|---|
| JP | 61 95827 | 5/1986 |
| JP | 9 248719 | 9/1997 |
| JP | 2000 94221 | 4/2000 |
| JP | 2006 75952 | 3/2006 |
| WO | WO 2006027946 A1 | 3/2006 |
| WO | WO 2008050404 A1 | 5/2008 |

OTHER PUBLICATIONS

Hermann Ebert, Magnetic Fields of Force, Published by Longmans, Green, and Co., 1897.

* cited by examiner

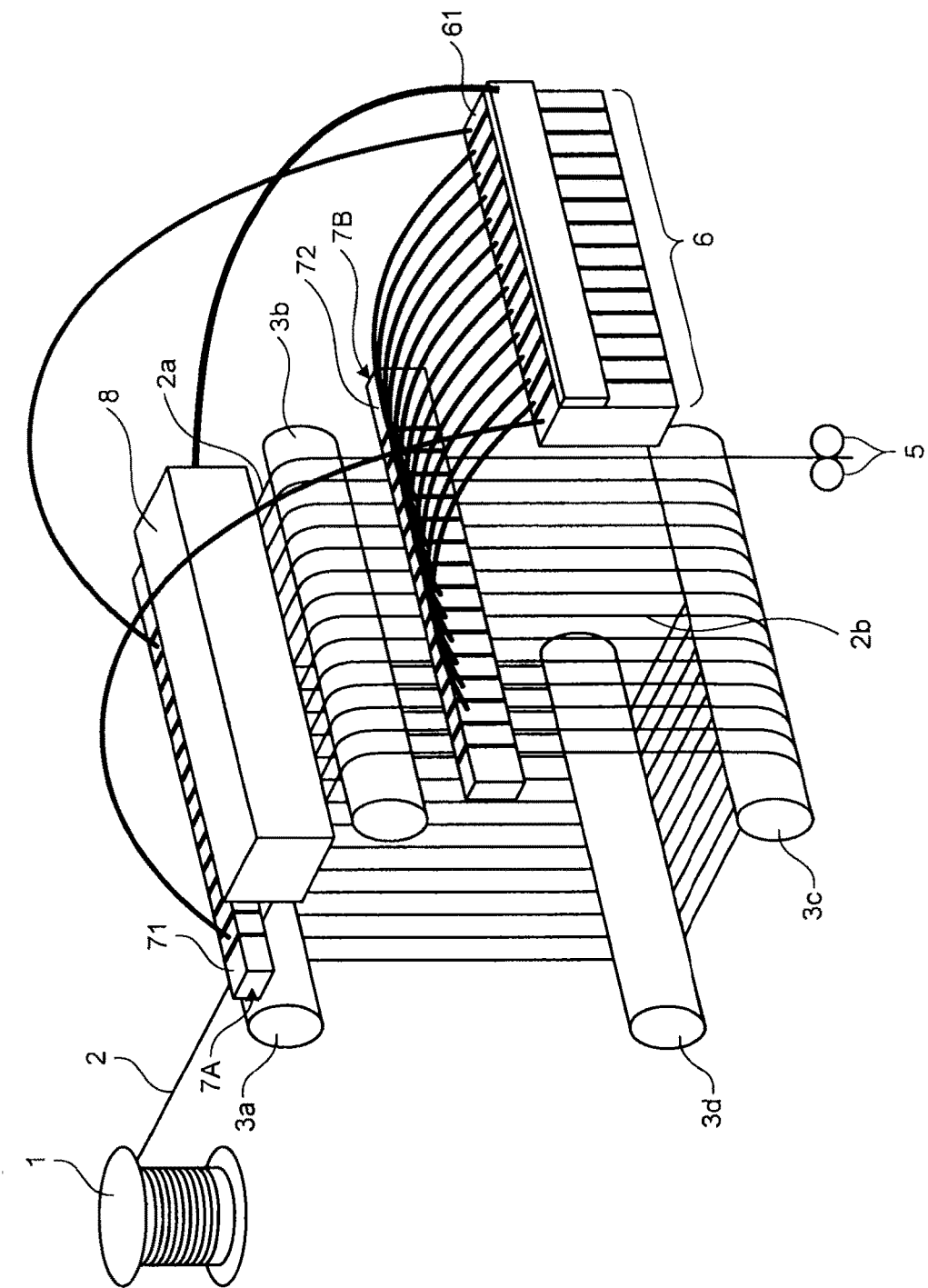

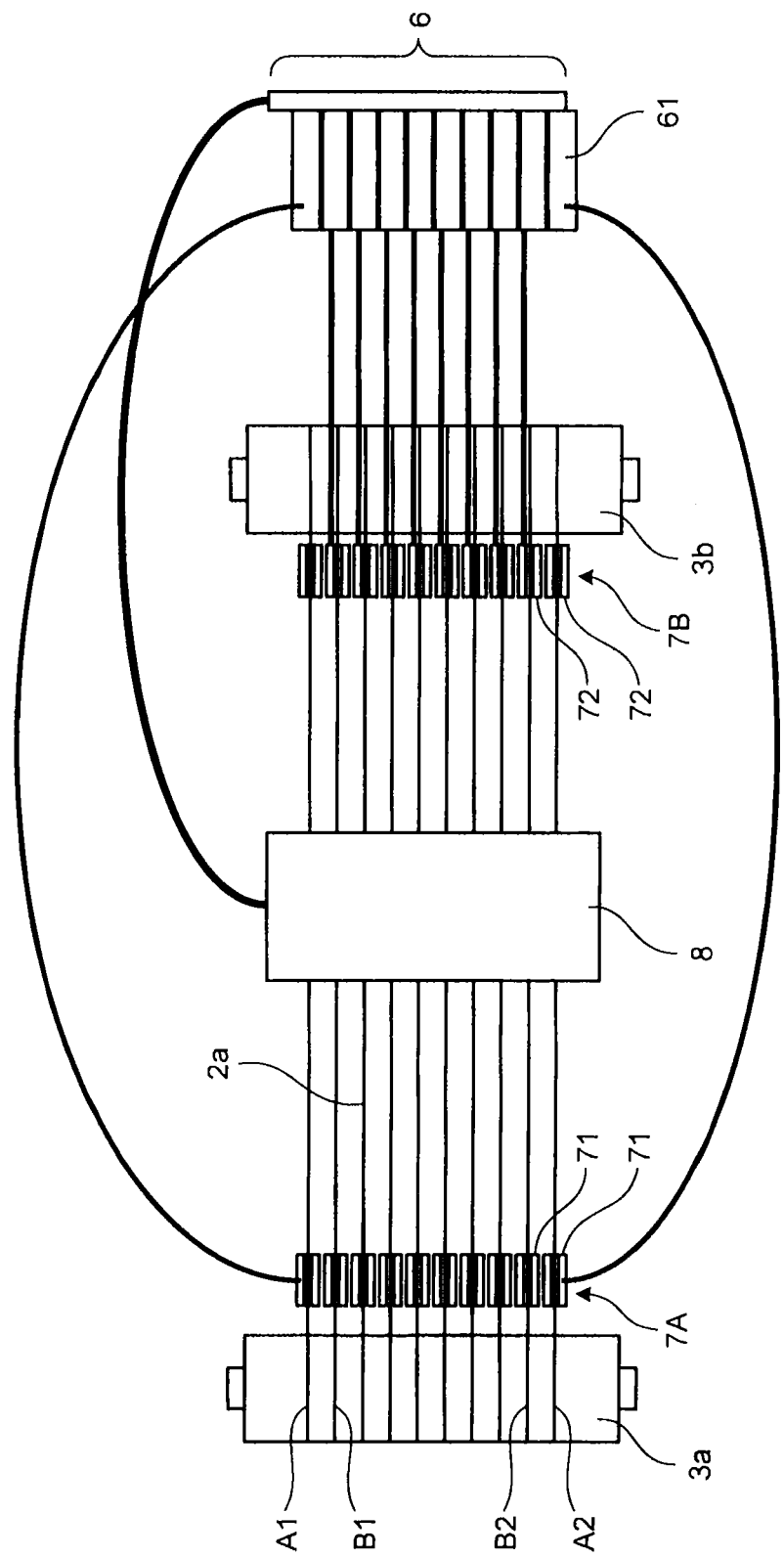

WIRE DISCHARGE-MACHINING APPARATUS WITH PARALLEL CUTTING WIRES

CROSS-REFERENCE TO RELATED APPLICATIONS

This application is a continuation of U.S. patent application Ser. No. 12/999,106, filed Dec. 15, 2010, which is a National Stage Application of PCT Application No. PCT/JP2009/060946, filed Jun. 16, 2009, which claims priority to Japanese Patent Application No. 2008-157236, filed Jun. 16, 2008. The entire contents of U.S. patent application Ser. No. 12/999,106 are incorporated herein by reference in their entirety.

TECHNICAL FIELD

The present invention relates to a wire discharge-machining apparatus, and more particularly relates to a wire discharge-machining method for cutting a workpiece into plural sheet members at a time by winding a wire electrode in parallel between plural guide rollers and by generating electric discharges between wire electrodes arranged in parallel and the workpiece, and the wire discharge-machining method achieves machining in high shape precision while preventing the wire electrodes from being warped by magnetic fields generated due to currents flowing to the parallel wire electrodes. The present invention also relates to a manufacturing method of a member of which high machining precision is required, such as a semiconductor wafer and a solar cell wafer.

BACKGROUND ART

When slice machining a wafer from a pillar-shaped workpiece by a wire discharge-machining apparatus, there has been proposed an approach to improve productivity of slice machining the workpiece by simultaneously generating electric discharges between the workpiece and cutting wires by individually passing a current to each cutting wire among many cutting wires arranged by winding a wire electrode in parallel between plural guide rollers (see, for example, Patent documents 1 and 3).

In a semiconductor wafer manufacturing apparatus having the above configuration, magnetic fields are generated around parallel wire electrodes when a machining current flows to the wire electrodes, an electromagnetic force works on adjacent wire electrodes, and then warps the wire electrodes in some cases. On the other hand, in a conventional semiconductor wafer manufacturing apparatus such as that described in Patent document 1, currents are supplied from both sides of the workpiece to parallel wires. Therefore, no countermeasure is taken against warping of wire electrodes due to the electromagnetic force of the wire electrodes.

Meanwhile, regarding the electromagnetic force working on the wire electrodes, for example, Patent document 2 describes, in a configuration of a wire discharge-machining apparatus, a method of using an electromagnetic force in an operation to return a wire electrode to a direction of avoiding a short-circuit when the wire electrode is short-circuited with a workpiece. That is, magnetic fields are generated around a workpiece by passing an auxiliary current to the workpiece, and the wire electrode is restored by using the magnetic fields and an electromagnetic force of a machining current flowing to the wire electrode. By controlling the strength and flow direction of an auxiliary current according to a machining state, the strength of magnetic fields is changed to control an electromagnetic force working on the wire electrode.

However, in the wire discharge-machining apparatus having a configuration such as that described in Patent document 2, the apparatus does not assume magnetic fields working between wire electrodes by passing a machining current to parallel wire electrodes arranged by winding a wire electrode around plural guide rollers like in the present invention. Therefore, in the control of an auxiliary current to the workpiece, an electromagnetic force working on the wire electrode cannot be reduced by the magnetic fields described above. Further, controlling sizes and flow directions of auxiliary currents supplied to the workpiece during machining results in changing energy of electric discharge machining, and this becomes a cause of degrading machining precision and reducing its machining speed.

The technique proposed in Patent document 2 is to improve an avoiding operation of a short-circuit state, but does not become a method of preventing warping of wire electrodes due to an electromagnetic force when machining using a wire electrode.

PRIOR ART DOCUMENTS

Patent Documents

Patent document 1: Japanese Patent Application Laid-open No. 2000-94221
Patent document 2: Japanese Patent Application Laid-open No. S61-95827
Patent document 3: Japanese Patent Application Laid-open No. H9-248719

DISCLOSURE OF INVENTION

Problem to be Solved by the Invention

Let us assume a case that currents flow concurrently in the same direction to parallel wire electrodes in a wire discharge-machining apparatus having a wire electrode arranged in parallel by winding the wire electrode around plural guide rollers as described above. For example, it is assumed that a current I flows to 500 parallel wire electrodes arranged at an interval r. In this case, wire electrodes at both ends receive the largest force, and a force F received by these wire electrodes is derived by the following equation.

$$F = \sum_{n=1}^{499} \frac{\mu_0 I^2}{2\pi n r} \tag{1}$$

When an average current of 2 amperes flows to parallel wire electrodes at a 400-micrometer pitch, the force F becomes as follows.

$\mu_0 = 4\pi \times 10^{-7}$ kg·m/C$^2$ $I = 2$ A $= 2$ C/s $r = 400 \times 10^{-6}$ m then $F = 0.0136$ N/m $\tag{2}$ That is, a uniform load of 0.0136 Newton is applied to the wire electrodes per length of 1 meter, and this uniform load warps the wire electrodes. While this warping is normally corrected by giving a predetermined tension to the wire electrodes, when the tension applied is too large, wire electrodes are disconnected. The limit of tension that can be applied is different according to the material and diameter of the wire electrode. Therefore, even when the uniform load is the same, a warping amount changes depending on the used wire electrode.

For example, in a case of a brass wire with a diameter of 0.2 millimeter, a tension that can be applied is about 15 Newtons, and warping of wire electrodes per length of 1 meter due to the uniform load becomes about 113 micrometers. In a case of a piano wire with a diameter of 0.1 millimeter, a tension that can be applied is about 5 Newtons, and warping of wire electrodes per length of 1 meter due to the uniform load becomes about 340 micrometers. However, because this is a case that an average current flowing to wire electrodes is 2 amperes and because a current is supplied in a pulse shape in actual electric discharge machining, a current larger than 2 amperes flows to the wire electrodes. Further, in the equation (1), the force F received by the wire electrodes becomes larger than a calculation value described above, because the force F works by a square of the current I. That is, a warping amount of wire electrodes becomes larger than the above calculation value, and an occurrence of warping at a pitch higher than that of parallel wire electrodes is anticipated. An electromagnetic force varies and a warping amount of wire electrodes also varies depending on a pulse-shaped current. Because a workpiece is machined while oscillating the parallel wire electrodes, a machining trench width becomes large and the workpiece cannot be cut out thin.

Warping of wire electrodes does not occur at only a machining start stage, and a machining current flowing to the wire electrodes by electric discharge machining generates a magnetic field, and this causes an electromagnetic force to work on other parallel wire electrodes. In a state that parallel wire electrodes enter the workpiece along progress of machining, even when the workpiece is present between parallel wire electrodes, a magnetic field generated from other parallel wire electrodes is not shielded and an electromagnetic force works on the other parallel wire electrodes to warp the wire electrodes, if the workpiece is not a magnetic substance.

The present invention has been achieved to solve the above problems, and an object of the present invention is to obtain a wire discharge-machining apparatus and a wire discharge-machining method for achieving high-precision machining by preventing an occurrence of warping due to an electromagnetic force working on parallel wire electrodes. Another object of the present invention is to obtain a method of processing a material in a wafer shape while preventing warping of wires when manufacturing semiconductor wafers and solar cell wafers.

Means for Solving Problem

In order to solve the aforementioned problems, a wire discharge-machining apparatus and a wire discharge-machining method, semiconductor wafer manufacturing apparatus and semiconductor wafer manufacturing, and solar-cell wafer manufacturing method according to one aspect of the present invention is construed in such a manner as to include: a wire electrode set as cutting wires provided in parallel with a distance therebetween and facing a workpiece; a machining power source that generates a pulse-shaped machining voltage; and a plurality of feeder units that are electrically connected to the cutting wires respectively of the cutting wire electrode and supply the machining voltage between the cutting wires and the workpiece respectively, wherein in the parallel cutting wires, the feeder units are arranged such that a direction of a current passed to at least a part of the cutting wires becomes a direction different from a direction of a current passed to other cutting wires.

In the wire discharge-machining apparatus and the method thereof, the semiconductor wafer manufacturing apparatus and the method thereof, and the solar-cell wafer manufacturing apparatus and the method thereof, directions of currents flowing to adjacent cutting wires are set mutually opposite to offset strengths of magnetic fields generated by the wire electrodes in parallel wire electrodes. By using this offset of magnetic fields, machining currents are supplied such that currents flowing to parallel wire electrodes do not have the same direction in all wire electrodes.

Effect of the Invention

According to the present invention, in the parallel wire electrodes of which predetermined regional parts provided in parallel with a distance from each other face a workpiece and become cutting wires, the feeder units are arranged such that directions of currents supplied to adjacent cutting wires become mutually opposite. Therefore, magnetic fields generated by machining currents flowing to the cutting wires by electric discharge machining are either offset by magnetic fields generated by currents flowing to adjacent cutting wires in opposite directions or weakened. As a result, an electromagnetic force working on the cutting wires is reduced, and thus warping of wire 10 electrodes is suppressed.

BRIEF DESCRIPTION OF DRAWINGS

FIG. 4 is a perspective view of a wire discharge-machining apparatus according to a third embodiment of the present invention.

FIG. 5 is an explanatory diagram of a configuration of power feeding to parallel wire electrodes according to a third embodiment of the present invention.

BEST MODE(S) FOR CARRYING OUT THE INVENTION

First Embodiment

Figure 1:
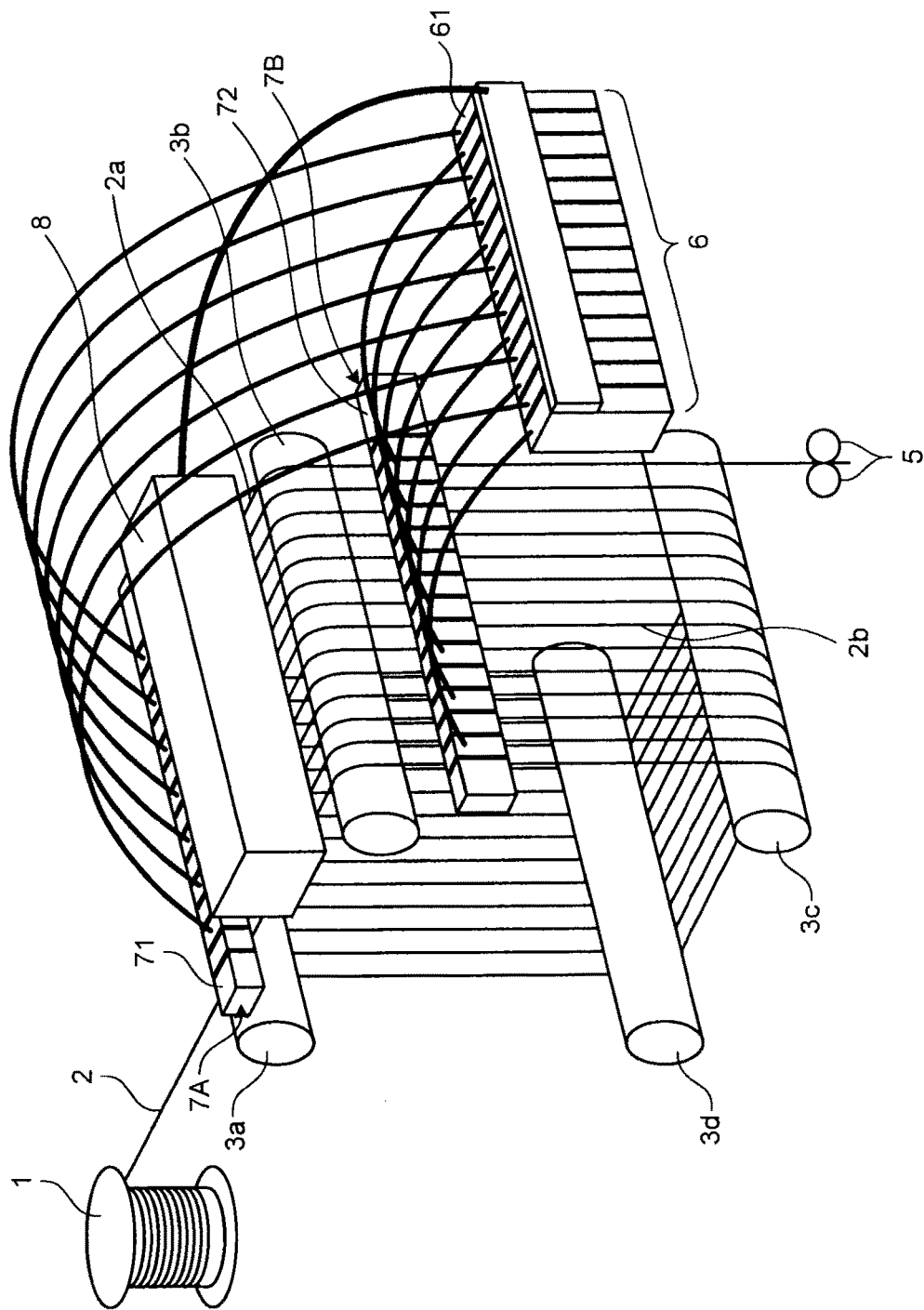
FIG. 1 is a perspective view of a configuration of a wire discharge-machining apparatus according to a first embodiment of the present invention.

Configurations and operations according to embodiments of the present invention are explained below. FIG. 1 is a perspective view of a wire discharge-machining apparatus according to a first embodiment of the present invention. In the wire discharge-machining apparatus according to the first embodiment, a wire electrode 2 reeled out from a wire bobbin 1 is sequentially wound between plural guide rollers 3a to 3d at plural times with a small distance between wounded parts of the wire electrode 2, thereby forming plural cutting wires. A distance between cutting wires formed by winding the wire electrode 2 becomes a machining width (a wafer thickness) of a workpiece 8. That is, the workpiece 8 is cut in an electrically discharged manner by each cutting wire by cutting feeding the workpiece 8 to each cutting wire while supplying a voltage between each cutting wire and the workpiece 8 in a state that the workpiece 8 is set opposite to each cutting wire with a predetermined distance between the cutting wires. Accordingly, the workpiece 8 is cut into plural wafers. The workpiece 8 is a material to be sliced into thin sheets, and includes metals such as tungsten and molybdenum that become a sputtering target, ceramics such as polycrystalline silicon carbide used for various structural members, semiconductor materials such as monocrystalline silicon and polycrystalline silicon carbide that become a semiconductor device wafer, and solar cell materials such as monocrystalline silicon and polycrystalline silicon that become a solar cell wafer. The semiconductor materials and the solar cell materials generally have a specific resistance equal to or higher than 0.0001 Ωcm, and materials that can be machined in an electrically discharged manner generally have a specific resistance equal to or lower than 100 Ωcm, preferably equal to or lower than 10 Ωcm. Therefore, in the present invention, materials having a specific resistance equal to or higher than 0.0001 Ωcm and equal to or lower than 10 Ωcm are preferable as the semiconductor materials and the solar cell materials. In an example shown in FIG. 1, although one wire electrode 2 is wound around plural guide rollers, plural cutting wires can be formed by folding back one wire electrode 2 instead of this method, and a specific configuration thereof is not particularly limited.

In the first embodiment, the plural guide rollers 3a to 3d are arranged in parallel with a distance between them in an axial line direction. The guide roller 3a and the guide roller 3b are provided at highest positions, and the guide roller 3c is provided at a lowest position below the guide roller 3b. The guide roller 3d is provided below the guide roller 3a arranged with the guide roller 3c.

The wire electrode 2 is ejected from a wire ejection roller 5 after being wound at a predetermined number of times. A portion of the wire electrode 2 between the guide roller 3a and the guide roller 3b becomes a cutting wire 2a capable facing the workpiece 8 and machining the workpiece 8. As shown in FIG. 1, the workpiece 8 is arranged opposite to the cutting wire 2a at a small distance between the cutting wire 2a and the workpiece 8 to perform an electric discharge-machining process. A portion of the wire electrode 2 between the guide roller 3b and the guide roller 3c becomes a power feeding wire 2b to which a voltage (a machining voltage) to perform electric discharge machining is supplied.

A voltage (a machining voltage) to perform electric discharge machining is supplied to the power feeding wire 2b of the wire electrode 2 from a machining power source 6 via feeders 7A and 7B, and a voltage is supplied between the power feeding wire 2b and the workpiece 8. The machining power source 6 is configured by plural machining power-source units 61 capable of independently supplying a voltage. The feeders 7A and 7B are configured by plural feeder units 71 and 72, respectively insulated from each other, and can independently supply a voltage to each cutting wire 2a. The plural machining power-source units 61 capable of independently supplying a voltage to parallel wire electrodes are connected to a control device (not shown) of the wire discharge-machining apparatus.

Naturally, a voltage application polarity can be suitably inverted according to need, in a similar manner to that of conventional wire discharge machining. A position of the workpiece 8 is controlled by a position control device (not shown) to have a small distance from the wire electrode 2 wound between the guide rollers 3a to 3d. Therefore, an appropriate electric-discharge gap length is maintained for the workpiece 8. A machining liquid (not shown) is supplied between the workpiece 8 and the wire electrode 2 by blowing or by immersion in a similar manner to that of normal wire discharge machining.

Figure 2:
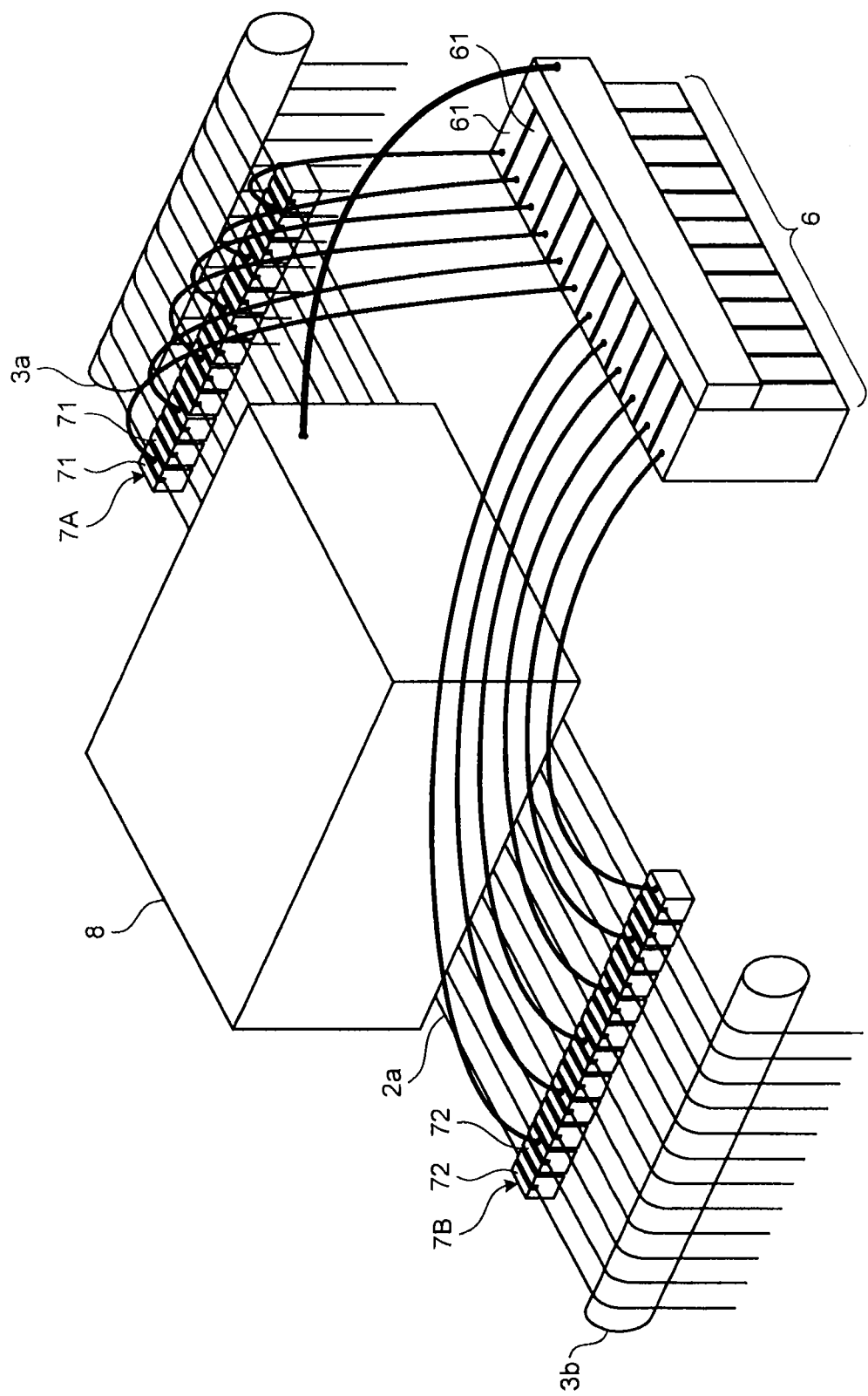
FIG. 2 is an explanatory diagram of a configuration of power feeding to parallel wire electrodes according to the first embodiment of the present invention.

Power feeding to parallel wire electrodes in the wire discharge-machining apparatus according to the first embodiment of the present invention is explained next. FIG. 2 depicts only a periphery of a part that feeds power to the parallel wire electrodes to make clear a state of power feeding to the parallel wire electrodes and the workpiece according to the first embodiment. When supplying machining currents to the workpiece 8 from the plural machining power-source units 61, power feeding lines of all of the machining power-source units 61 are connected to the workpiece 8. Other power feeding lines of the machining power-source units 61 are connected to feeder units (the feeder unit 71 or the feeder unit 72) corresponding to the cutting wires 2a, respectively, and are connected to feeder units in a configuration described below. Two feeder units 71 and 72 provided in each of the cutting wire 2a are arranged at positions to sandwich the workpiece 8 as shown in FIG. 2. The cutting wires 2a are supported to bridge between the two feeder units 71 and 72. Other power feeding lines of the machining power-source units 61 are alternately connected to the two feeder units 71 and 72 as shown in FIG. 2. When a power feeding line is connected to the feeder unit 71 corresponding to a certain cutting wire 2a, a power feeding line is connected to the feeder unit 72, not the feeder unit 71, in the cutting wire 2a adjacent to this cutting wire. With this configuration, when directions of currents flowing to parallel cutting wires 2a become mutually opposite directions between adjacent cutting wires 2a, feeder units to which power feeding lines are not connected function as wire guides (supporting members), and arrange plural cutting wires 2a in parallel in cooperation with feeder units to which power feeding lines are connected.

According to this configuration, in a state that electric discharge machining occurs between the plural cutting wire 2a and the workpiece 8, and machining currents concurrently flow to the cutting wires 2a, flowing directions of machining currents become mutually opposite directions. Therefore, magnetic fields generated by the cutting wires 2a are offset by magnetic fields generated by mutually adjacent cutting wires 2a. Consequently, an electromagnetic force that becomes a force to warp the cutting wires 2a by working on the cutting wires 2a can be suppressed.

As described above, according to the configuration of the first embodiment, one wire electrode 2 is wound between the plural guide rollers 3a to 3d to form the plural cutting wires 2a. The machining power source 6 and the feeders 7A and 7B are provided to individually feed power to each cutting wire 2a and such that directions of currents flowing to the cutting wires 2a become mutually opposite between adjacent cutting wires 2a. Accordingly, warping of wire electrodes at both ends of the parallel cutting wires 2a can be reduced, and the wire electrodes at both ends of the parallel cutting wires 2a are not warped during machining. As a result, a machined part of the workpiece 8 does not become in an arc shape but becomes a straight line. Consequently, machining precision improves, and thicknesses of wafers cut out at a time from the workpiece 8 by the parallel cutting wires 2a become uniform.

Second Embodiment

In the first embodiment described above, a system of preventing warping of the cutting wires 2a due to an electromagnetic force is explained. According to this system, one wire electrode 2 is wound between the plural guide rollers 3a to 3d to form the plural cutting wires 2a. The machining power source 6 and the feeders 7A and 7B are provided to individually feed power to each cutting wire 2a and to set directions of currents flowing to the cutting wires 2a mutually opposite between adjacent cutting wires 2a. That is, the system according to the first embodiment supplies power to the parallel cutting wires 2a such that flow directions of currents become mutually opposite between adjacent cutting wires 2a, thereby offsetting magnetic fields generated by the cutting wires 2a. This system can prevent warping of the cutting wires 2a due to an electromagnetic force, and can improve machining shape precision. In a second embodiment, a modification of the first embodiment to suppress warping of the cutting wires 2a due to an electromagnetic force in a power feeding system to parallel cutting wires 2a is explained.

Figure 3:
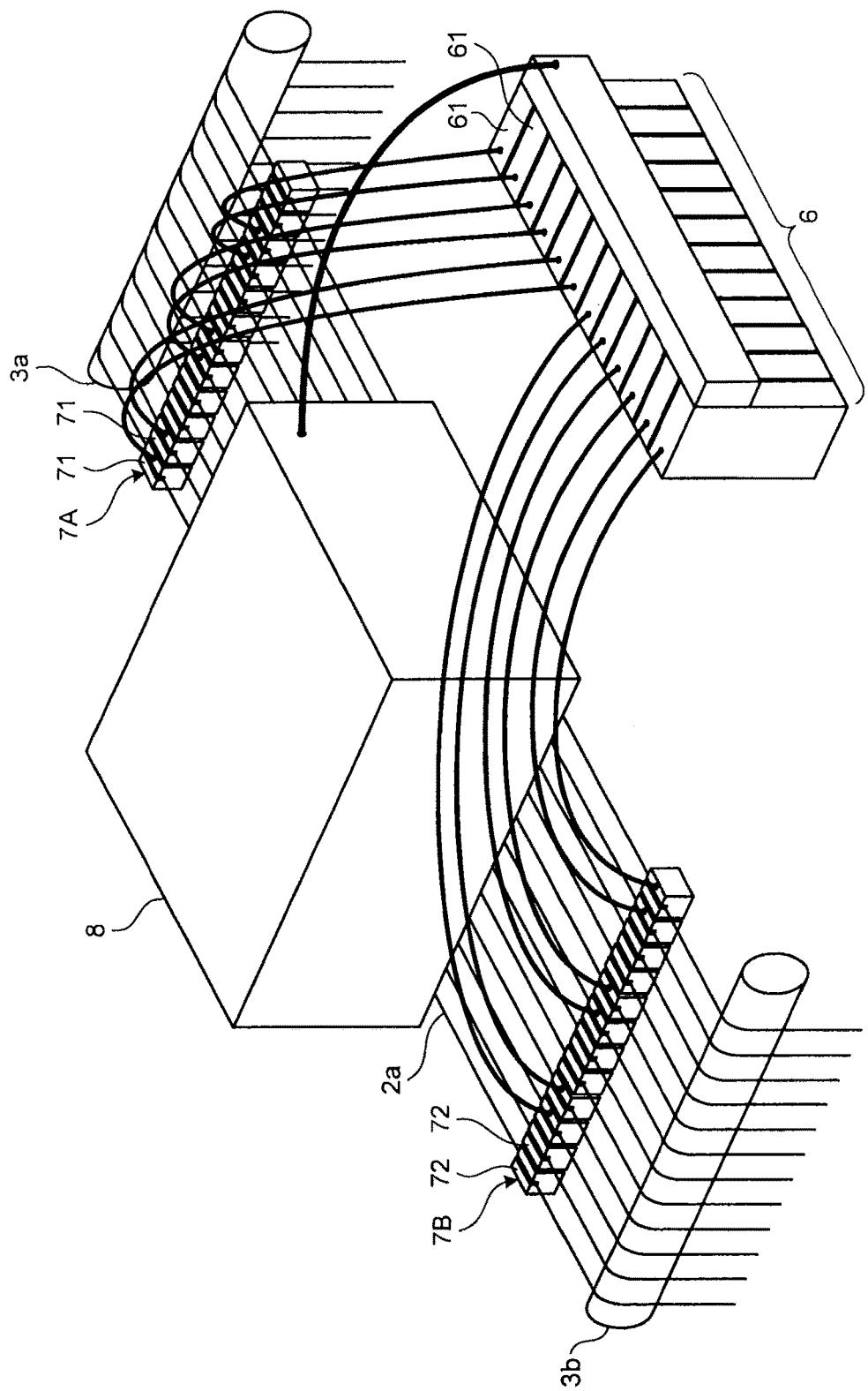
FIG. 3 is an explanatory diagram of a configuration of power feeding to parallel wire electrodes according to a second embodiment of the present invention.

FIG. 3 depicts a part that feeds power to the parallel wire electrodes according to the second embodiment. A basic device configuration of the second embodiment is the same as that of the first embodiment shown in FIG. 2, and a connection system of power feeding lines from the machining power-source units 61 to feeders arranged opposite to the workpiece 8 are different, as shown in FIG. 3. Therefore, in the following explanations, configurations different from those of the first embodiment shown in FIGS. 1 and 2 are mainly explained and explanations of identical configurations will be omitted.

As shown in FIG. 3, in the second embodiment, power feeding lines at a polarity side not connected to the workpiece 8 out of two polarities of the machining power-source units 61 are connected to the feeder units 71 and 72. In this case, in the first embodiment, the feeder units 71 and 72 aligned at the same side of the workpiece 8 are alternately connected to the cutting wires 2a to alternately feed power to the feeder units 71 and 72 opposite to the cutting wires 2a. In the second embodiment, the feeder units 71 and 72 at a power-feeding-line connection side are not alternately connected to the cutting wires 2a. Two adjacent cutting wires 2a are set as one group, and power feeding lines at the same polarity side are connected to the feeder units 71 and 72 arranged at the same side, in this one group, that is, these two cutting wires 2a. The cutting wire 2a adjacent to this one group of the cutting wires 2a and the cutting wire 2a further adjacent to this cutting wire 2a are set as one group. Power feeding lines of the machining power-source units 61 are connected to the feeder units 71 and 72 arranged at the opposite side of the above group of the cutting wires 2a, in the group of two cutting wires 2a.

Instead of setting adjacent two parallel wires as one group as described above, plural (three, or four, five onwards) cutting wires 2a can be set as one group. In this way, the feeder units 71 and 72 are electrically connected to the wire electrodes 2 of the cutting wires 2a such that adjacent plural cutting wires 2a are set as each group, directions of currents passed to the cutting wires 2a of the same group are set to be the same directions, and directions of currents passed to the cutting wires 2a of adjacent groups become mutually opposite directions. In this case, feeder units to which power feeding lines are not connected function as wire guides (supporting members), and arrange plural cutting wires 2a in parallel on the same plane in cooperation with feeder units to which power feeding lines are connected.

According to this configuration, in a state that electric discharge machining occurs between the parallel cutting wires 2a and the workpiece 8 and that machining currents flow to the parallel cutting wires 2a, magnetic fields generated by the machining currents are weakened by magnetic fields generated in peripheral cutting wires 2a. Therefore, an electromagnetic force working on the cutting wires 2a to warp the cutting wires 2a can be reduced.

As described above, according to the second embodiment, effects similar to those of the first embodiment are obtained, and power feeding lines can be easily arranged in a power feeding configuration to the parallel cutting wires 2a because power is fed such that plural cutting wires 2a of parallel cutting wires 2a are handled as one group and current flow directions become opposite between groups.

Third Embodiment

In the first embodiment described above, a system of preventing warping of the cutting wires 2a due to an electromagnetic force is explained. According to this system, one wire electrode 2 is wound between the plural guide rollers 3a to 3d to form the plural cutting wires 2a. The machining power source 6 and the feeders 7A and 7B are provided to individually feed power to each cutting wire 2a and to set directions of currents flowing to the cutting wires 2a mutually opposite between adjacent cutting wires 2a. That is, the system according to the first embodiment supplies power to the parallel cutting wires 2a such that flow directions of currents become mutually opposite between adjacent cutting wires 2a, thereby offsetting magnetic fields generated by the cutting wires 2a. This system can prevent warping of the cutting wires 2a due to an electromagnetic force, and can improve machining shape precision.

In the second embodiment, in the power feeding system to the parallel cutting wires 2a, plural parallel cutting wires 2a are handled as groups, power is fed to the cutting wires 2a constituting these groups such that currents flow in the same direction, and current directions passed to the cutting wires 2a of adjacent groups become mutually opposite. In this system, warping of the cutting wires 2a due to an electromagnetic force can be suppressed and machining shape precision can be improved, by weakening the strength of magnetic fields generated by currents flowing to the cutting wires 2a.

In a third embodiment, there is explained a power feeding system to the cutting wires 2a which does not pass currents alternately or in opposite directions for each of the few cutting wires but reduces as far as possible the number of cutting wires 2a to which currents in opposite directions are passed, thereby reducing the magnetic field strength and suppressing warping of the cutting wires 2a due to an electromagnetic force.

FIG. 4 is a perspective view of a wire discharge-machining apparatus according to the third embodiment of the present invention. As shown in FIG. 4, a basic configuration of the third embodiment is identical to that of the first embodiment shown in FIG. 1. Therefore, in the following explanations, configurations different from those of the first embodiment shown in FIG. 1 are mainly explained and explanations of identical configurations will be omitted.

Also in the third embodiment, in a similar manner to those of the first and second embodiments, the wire electrode 2 reeled out from the wire bobbin 1 is wound between the plural guide rollers 3a to 3d at plural times with a small distance between the wire electrodes, thereby forming plural wire running systems. Finally, the wire electrode 2 is wound at a predetermined number of times, and is ejected from the wire ejection roller 5. In this case, in the third embodiment, a portion of the wire electrode 2 between the guide roller 3a and the guide roller 3b becomes the cutting wire 2a to machine the workpiece 8. As shown in FIG. 4, the workpiece 8 is arranged opposite to the cutting wires 2a with a small distance between the cutting wires 2a and the workpiece 8 to perform an electric discharge-machining process. A portion of the wire electrodes 2 between the guide roller 3b and the guide roller 3c becomes the power feeding wires 2b to which a voltage (a machining voltage) to perform electric discharge machining is supplied. A voltage (a machining voltage) to perform electric discharge machining is supplied to the power feeding wires 2b of the wire electrode 2 from the machining power source 6 via the feeders 7A and 7B, and a voltage is supplied between the power feeding wires 2b and the workpiece 8. The machining power source 6 is configured by plural machining power-source units 61 capable of independently supplying a voltage. The feeders 7A and 7B are configured by the plural feeder units 71 and 72, respectively insulated from each other, and can independently supply a voltage to each cutting wire 2a. The plural machining power-source units 61 capable of independently supplying a voltage to parallel cutting wires 2a are connected to a control device (not shown) of the wire discharge-machining apparatus.

Power feeding to the parallel wire electrodes in the wire discharge-machining apparatus according to the third embodiment of the present invention is explained next. FIG. 5 depicts a state that, in the first embodiment, in feeding power of the machining power source 6 configured by the machining power-source units 61 to the workpiece 8, power feeding lines connected to the same polarity side of all the machining power-source units 61 are connected to the workpiece 8. Power feeding lines from another same polarity side of the machining power-source units 61 are connected to feeder units shown in FIG. 5. Power feeding lines from a polarity side of the machining power-source units 61 not connected to the workpiece 8 are connected to feeder units arranged at the same side as the workpiece 8, except wire electrodes at both ends among the parallel cutting wires 2a. On the other hand, to feed power to the cutting wires 2a at both ends among the parallel cutting wires 2a, power feeding lines from the polarity side of the machining power-source units 61 not connected to the workpiece 8 are connected to feeder units arranged to support at two points the cutting wires 2a machining the workpiece 8, at positions sandwiching the workpiece 8 as shown in FIG. 5. In this case, feeder units to which power feeding lines are not connected function as wire guides (supporting members), and arrange plural cutting wires 2a in parallel on the same plane in cooperation with feeder units to which power feeding lines are connected.

An operation of the third embodiment is explained next. FIG. 5 depicts peripheral parts of a feeder unit configured by the parallel cutting wires 2a and the workpiece 8, the guide rollers 3a and 3b, the feeders 7A and 7B, and the machining power-source units 61. In the configuration shown in FIG. 5, when an electric discharge occurs between the cutting wires 2a and the workpiece 8, currents from the machining power-source units 61 pass through the power feeding lines and flow to the cutting wires 2a via the feeder units 71 and 72. At this time, currents in the same direction flow to other parallel cutting wires 2a excluding cutting wires A1 and A2 at both ends, among the cutting wires 2a arranged in parallel.

Magnetic fields are generated at the periphery of the cutting wires 2a by the currents, and an electromagnetic force works on the cutting wires 2a in which currents flow. Particularly, in the parallel cutting wires 2a to which currents flow in the same direction, the largest electromagnetic force works on cutting wires B1 and B2 positioned at both ends, thereby warping the cutting wires 2a. However, according to the power feeding system of the third embodiment, power is fed to the cutting wires A1 and A2 at both ends of the parallel wires to pass currents in a direction opposite to that of currents in other parallel cutting wires 2a, such as B1 and B2. Therefore, magnetic fields generated by currents flowing to the cutting wires A1 and A2 effectively weaken the magnetic field strength working on the cutting wires B1 and B2 at both ends of the parallel cutting wires 2a to which the currents flow in the same direction. Accordingly, an electromagnetic force working on the cutting wires B1 and B2 is suppressed, and warping of the cutting wires 2a is prevented. At the same time, the magnetic field strength working on the cutting wires A1 and A2 is weakened, and an electromagnetic force working on the cutting wires A1 and A2 is suppressed, thereby preventing warping of the cutting wires 2a.

As explained above, according to the third embodiment, a direction of a current flowing to each one cutting wire 2a positioned at both ends of parallel cutting wires 2a is set opposite to a direction of currents flowing to remaining parallel cutting wires 2a excluding these two cutting wires 2a. Therefore, an electromagnetic force working on the cutting wires 2a can be reduced, and warping of the cutting wires 2a can be prevented.

In the first to third embodiments, as an example, there have been explained a wire discharge-machining apparatus having plural wire running systems provided by winding the wire electrode 2 between plural guide rollers with a distance between the wire running systems. However, the present invention is not limited thereto, and the first to third embodiments can be also applied to a wire discharge-machining apparatus including three or more wire electrodes that generate an electric discharge between a workpiece and the wire electrodes, even when the wire electrodes are not wound up.

An arrangement positional relationship among the guide rollers, the feeder units, and the workpiece or a stage (not shown) on which the workpiece is mounted in the first to third embodiments is explained. For example, the guide rollers can be arranged between the feeder units arranged at both sides of a workpiece or a stage on which the workpiece is mounted and the workpiece or the stage on which the workpiece is mounted, as shown in FIGS. 1 and 4.

Alternatively, as shown in FIGS. 2, 3, and 5, the feeder units can be arranged at both sides of the workpiece or of the stage on which the workpiece is mounted, and the guide rollers can be arranged at sides of the feeder units thereof where the workpiece or the stage on which the workpiece is mounted is not arranged.

When semiconductor materials such as monocrystalline silicon and polycrystalline silicon carbide, solar cell materials such as monocrystalline silicon and polycrystalline silicon, ceramics such as polycrystalline silicon carbide, and sputtering target materials such as tungsten and molybdenum are machined by the above wire discharge-machining method, an electromagnetic force working between wires during electric discharge machining is offset or reduced, and thus warping of wire electrodes is prevented. Therefore, plural wafers can be cut out at a time in high size precision.

EXPLANATIONS OF LETTERS OR NUMERALS

1 Wire bobbin
2 Wire electrode
2a Cutting wire
2b Power feeding wire
3a, 3b, 3c, 3d Guide roller
5 Wire ejection roller
6 Machining power source
7A, 7B Feeder
8 Workpiece
61 Machining power-source unit
71, 72 Feeder unit

The invention claimed is:

1. A wire discharge-machining method comprising:
providing in parallel, with a distance therebetween and facing a workpiece, a wire electrode set as cutting wires;
generating a machining voltage by a machining power source;
electrically connecting a plurality of feeder units to the cutting wires respectively of the wire electrode;
supplying the machining voltage between the cutting wires and the workpiece respectively;
arranging the plurality of feeder units at both sides of the workpiece, the both sides including a first side and a second side;
connecting at least one feeder unit on the first side and at least one feeder unit on the second side to respective power feeder lines from the machining power source;
arranging the feeder units in the cutting wires such that a direction of a current passed to at least a part of the cutting wires becomes a direction different from a direction of a current passed to other cutting wires;
providing the feeder units on the first side and the second side for each of the cutting wires;
connecting the machining voltage from the machining power source to only one of the feeder units on either side of each of the cutting wires to thereby supply the machining voltage between the cutting wires and the workpiece; and
slice-machining the workpiece using the cutting wires.

2. A thin sheet manufacturing method comprising:
providing in parallel, with a distance therebetween and facing a workpiece, a wire electrode set as cutting wires;
generating a machining voltage by a machining power source;
electrically connecting a plurality of feeder units to the cutting wires respectively of the wire electrode;
supplying the machining voltage between the cutting wires and the workpiece respectively;
arranging the plurality of feeder units at both sides of the workpiece, the both sides including a first side and a second side;
connecting at least one feeder unit on the first side and at least one feeder unit on the second side to respective power feeder lines from the machining power source;
arranging the feeder units in the cutting wires such that a direction of a current passed to at least a part of the cutting wires becomes a direction different from a direction of a current passed to other cutting wires;
providing the feeder units on the first side and the second side for each of the cutting wires;
connecting the machining voltage from the machining power source to only one of the feeder units on either side of each of the cutting wires to thereby supply the machining voltage between the cutting wires and the workpiece; and
preparing a thin sheet from the workpiece using the cutting wires.

3. A semiconductor wafer manufacturing method comprising:
providing in parallel, with a distance therebetween and facing a semiconductor wafer material, a wire electrode set as cutting wires;
generating a machining voltage by a machining power source;
electrically connecting a plurality of feeder units to the cutting wires respectively of the wire electrode;
supplying the machining voltage between the cutting wires and the semiconductor wafer material respectively;
arranging the plurality of feeder units at both sides of the semiconductor wafer material, the both sides including a first side and a second side;
connecting at least one feeder unit on the first side and at least one feeder unit on the second side to respective power feeder lines from the machining power source;
arranging the feeder units in the cutting wires such that a direction of a current passed to at least a part of the cutting wires becomes a direction different from a direction of a current passed to other cutting wires;
providing the feeder units on the first side and the second side for each of the cutting wires; and
connecting the machining voltage from the machining power source to only one of the feeder units on either side of each of the cutting wires to thereby supply the machining voltage between the cutting wires and the semiconductor wafer material.

4. The semiconductor wafer manufacturing method according to claim 3, wherein the semiconductor wafer material is silicon or silicon carbide, or a material having silicon or silicon carbide as a main component.

* * * * *